US011119361B2

(12) United States Patent
Huang

(10) Patent No.: US 11,119,361 B2
(45) Date of Patent: Sep. 14, 2021

(54) METHOD OF MANUFACTURING AN ALIGNMENT FILM, A LIQUID CRYSTAL DISPLAY PANEL AND A PRINTING PLATE

(71) Applicant: WUHAN CHINA STAR OPTOELECTRONICS TECHNOLOGY CO., LTD., Hubei (CN)

(72) Inventor: Jianlong Huang, Hubei (CN)

(73) Assignee: WUHAN CHINA STAR OPTOELECTRONICS TECHNOLOGY CO., LTD, Hubei (CN)

( * ) Notice: Subject to any disclaimer, the term of this patent is extended or adjusted under 35 U.S.C. 154(b) by 471 days.

(21) Appl. No.: 16/308,486

(22) PCT Filed: Oct. 8, 2018

(86) PCT No.: PCT/CN2018/109264
§ 371 (c)(1),
(2) Date: Dec. 10, 2018

(87) PCT Pub. No.: WO2020/056802
PCT Pub. Date: Mar. 26, 2020

(65) Prior Publication Data
US 2021/0223594 A1  Jul. 22, 2021

(30) Foreign Application Priority Data
Sep. 20, 2018 (CN) .......................... 201811099402.6

(51) Int. Cl.
G02F 1/1337 (2006.01)
(52) U.S. Cl.
CPC ................................ G02F 1/13378 (2013.01)
(58) Field of Classification Search
CPC .................................................. G02F 1/13378
See application file for complete search history.

(56) References Cited

FOREIGN PATENT DOCUMENTS

JP  2006145969 A  *  6/2006  ........... G02F 1/1337

* cited by examiner

Primary Examiner — Donald L Raleigh
(74) Attorney, Agent, or Firm — Soroker Agmon Nordman

(57) ABSTRACT

A method of manufacturing an alignment film, a liquid crystal display panel, a printing plate are provided. The printing plate is used for coating a substrate with an alignment solution and comprises protrusions distributed at intervals on the substrate, and a gap is formed between two adjacent protrusions, and the gap is used for storing the alignment solution. The protrusions include a plurality of main protrusions presented as an array distribution and a plurality of auxiliary protrusions distributed in the array of the main protrusions. A height of each of the main protrusions is greater than a height of each of the auxiliary protrusions.

12 Claims, 2 Drawing Sheets

METHOD OF MANUFACTURING AN ALIGNMENT FILM, A LIQUID CRYSTAL DISPLAY PANEL AND A PRINTING PLATE

BACKGROUND OF THE INVENTION

Field of Invention

The present invention relates to a field of manufacturing of liquid crystal display panel, and more particularly to a method of manufacturing an alignment film, a liquid crystal display panel and a printing plate.

Description of Prior Art

In the panel industry, uneven display brightness directly affects the quality of the display panel. Many factors lead to the uneven display brightness, and the uneven display brightness is mainly resulted from a uniformity thickness of PI film (alignment film).

There are generally two ways to improve the uniformity of PI film thickness. One is to improve the uniformity of PI film thickness while ensuring the film thickness to be unchanged, and the other is to reduce the proportion of the film thickness difference to the overall film thickness by increasing the PI film thickness. Currently, it is not very well to improve the uniformity of PI film thickness under the condition of simply ensuring the film thickness unchanged, and thus how to increase the PI film thickness has become a mainly issue. The industry mainly uses ultra-high ink containing APR plates (printing plates) to increase the film thickness. However, in this way, there is a problem that the alignment film is not adhered to circuits in grooves of the substrate, thereby causing occurrence of poor display with pit-like defects during a lighting check thereof. Accordingly, there are drawbacks in the prior art, and it is urgently needed for an improvement.

SUMMARY OF THE INVENTION

The present application provides a method for manufacturing an alignment film, a liquid crystal display panel and a printing plate. The present invention can solve the problem of occurrence of poor display with pit-like defects during lighting check. And the problem is resulted from the alignment solution not filled at a local position.

In order to solve the above problems, the technical solutions provided by the present application are described as follows.

In one embodiment of the present invention, a printing for coating a substrate with an alignment solution includes a substrate and protrusions, and the protrusions are distributed at intervals on the substrate, a gap is formed between two adjacent protrusions, and the gap is used for storing the alignment solution. The protrusions include a plurality of main protrusions presented as an array distribution and a plurality of auxiliary protrusions distributed in the array of the main protrusions. A height of each of the main protrusions is greater than a height of each of the auxiliary protrusions.

In one embodiment of the present invention, the auxiliary protrusions are equally distributed between two adjacent main protrusions, and at least one of the auxiliary protrusions is disposed between the two adjacent main protrusions.

In one embodiment of the present invention, the auxiliary protrusions in the same row/column are disposed staggered with the main protrusions adjacent to the same row/column.

In one embodiment of the present invention, a volume of each of the auxiliary protrusions is less than a volume of each of the main protrusions.

In one embodiment of the present invention, heights of the auxiliary protrusions are not uniform, and the auxiliary protrusions are distributed with the heights thereof in a regular variation or an irregular variation.

In one embodiment of the present invention, the protrusions each have a shape of a truncated cone, a cone, a frustum or a pyramid.

In one embodiment of the present invention, the substrate includes a thin film transistor and a signal circuit, grooves are disposed at intervals in a surface of the substrate for laying the signal circuit, and a gap is existed between at least a portion of each of the protrusions and at least a portion of each of the grooves when the printing plate is pressed fit with the substrate.

In one embodiment of the present invention, a diameter of each of the auxiliary protrusions of the printing plate is less than a width of each of the grooves, and a gap is existed between each of the auxiliary protrusions and each of the grooves.

In one embodiment of the present invention, a diameter of each of the main protrusions or the printing plate is greater than a width of each of the grooves.

In another embodiment of the present invention, a method of forming an alignment film by the preceding printing plate includes the steps of: step S10, providing an array substrate for preparing the alignment film, grooves are disposed at intervals in a surface of the array substrate for laying a circuit. Step S20, pressing one side of the printing plate which is stored with the alignment solution fit with the array substrate, and a diameter of at least a part of the protrusions of the printing plate is greater or less than a width of each of the grooves, and the alignment solution stored in an entire surface of the printing plate flows into a surface of the array substrate. Step S30, after heat curing, the alignment films are formed on the each of grooves of the surface of the array substrate and a corresponding portion between two adjacent grooves.

In one embodiment of the present invention, a diameter of each of the main protrusions of the printing plate is greater than a width of each of the grooves, and the alignment solution is filled in the grooves.

In one embodiment of the present invention, a gap is existed between each of the auxiliary protrusions of the printing plate and each of the grooves, thereby the alignment solution is filled in the grooves.

In further embodiment of the present invention, a liquid crystal display panel manufactured by live preceding method includes an array substrate disposed opposite to a color film substrate and grooves formed in a surface of the array substrate for laying a circuit, and the surface of the array substrate is prepared with a first alignment film. A second alignment film is prepared on a side of the color film substrate facing the first alignment film. A liquid crystal layer is sandwiched in between the first alignment film and the second alignment film. The first alignment film is formed in each of the grooves of the surface of the array substrate and a corresponding portion between two adjacent grooves.

The present invention having the beneficial effects are described as follows. In comparison with a method of manufacturing the alignment film of the liquid crystal display panel in the prior art, the present application provides a method of manufacturing the alignment film, the liquid crystal display panel and the printing plate to form an alignment film by using the printing plate with different heights of protrusions matching with each other and coating the substrate with an alignment solution. Due to the design of the protrusions on the printing plate, the possibility of the protrusions covering the grooves in the surface of the substrate can be greatly decreased. On the other hand, thickness of the alignment film can be increased, thereby poor display with black spots such as pit-like resulting from the alignment film being non-sticking in the local position can be improved. At the same time, uneven thickness of the printing plate resulting poor display can be also improved due to that the thickness of the alignment film is increased.

BRIEF DESCRIPTION OF THE DRAWINGS

In order to more clearly illustrate embodiments or technical solutions in the present invention, the drawings used in the description of the embodiments or current technology will be briefly described below. Obviously, the drawings in the following description are merely some embodiments of the present invention. A person skilled in the art may also obtain other drawings without any creative efforts.

DETAILED DESCRIPTION OF THE PREFERRED EMBODIMENTS

Figure 1:
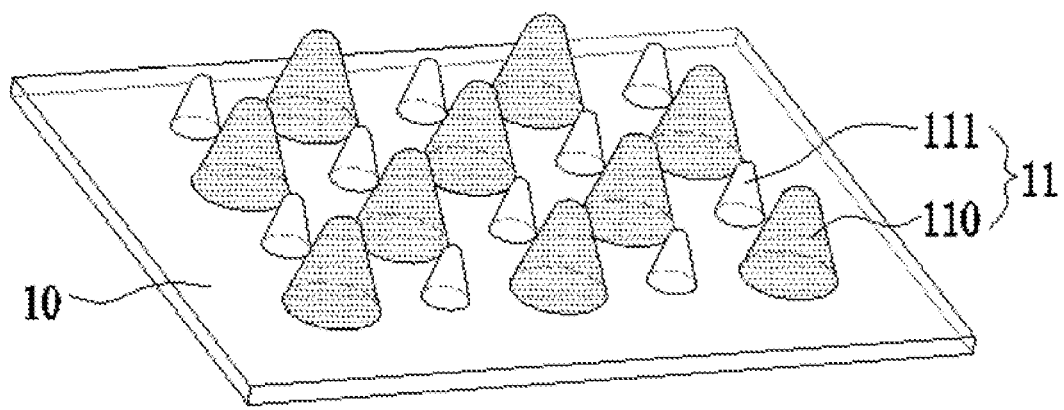
FIG. 1 is a schematic view of a printing plate according to one embodiment of the present invention.

The following description of the embodiments is provided by reference to the following drawings. Directional terms mentioned in this application, such as "up," "down," "forward," "backward," "left," "right," "inside," "outside," "side," etc., are merely indicated the direction of the drawings. Therefore, the directional terms are used for illustrating and understanding of the application rather than limiting thereof. In the figures elements with similar structure are indicated by the same reference numerals.

The present application is directed to a method for manufacturing an alignment film of a liquid crystal display panel There is a technical problem that a poor display with pit-like during light checking is resulted from the alignment solution not filled in a local position of the substrate. Following embodiments according to the present invention can solve the problem.

Referring to FIG. 1, it is a schematic view of a printing plate according to one embodiment of the present invention. The printing plate used for coating a substrate with an alignment solution includes a substrate 10 and a plurality of protrusions 11. The plurality of protrusions 11 are distributed at intervals on the substrate 10, and a gap is formed between two adjacent protrusions 11. The gap is used for storing the alignment solution. The protrusions 11 include a plurality of main protrusions 110 arranged in an array distribution. A plurality of auxiliary protrusions 111 are distributed in the array of the main protrusions 110. A height of each of the main protrusions 110 is greater than a height of each of the auxiliary protrusions 111. The main protrusions 110 plays a supporting role dining coating of the substrate with the alignment solution. The auxiliary protrusions 111 may not be in contact with the substrate. The main protrusions 110 and the auxiliary protrusions 111 cooperate with each other for storing the alignment solution.

The auxiliary protrusions 111 each are evenly distributed between two adjacent main protrusions 110, and at least one of the auxiliary protrusions ill is disposed between the two adjacent main protrusions 110. Alternatively, the auxiliary protrusions 111 in the same row column are disposed staggered with the main protrusions 110 that are adjacent to the row column. Here, the positional relationship between the auxiliary protrusions 111 and the main protrusions 110 are not limited; the only requirement is that the auxiliary protrusions 111 and the main protrusions 110 can cooperate with each other to hold the alignment solution.

The main protrusions 110 and the auxiliary protrusions 111 of the printing plate provided by one embodiment of the present invention are respectively designed to be equal in volume and height, and a volume of each of the auxiliary protrusions 111 is less than a volume of each of the main protrusions 110. The protrusions 11 each have a shape of a truncated cone, a cone, a frustum or a pyramid and are not limited thereof.

In this embodiment of the present invention, the protrusions are designed with two different heights to cooperate with each other, while the layout of the protrusions on the printing plate is maintained unchanged. Due to the auxiliary protrusions having a less volume than a volume of the main protrusions, the ability of the printing plate to store the alignment solution is enhanced so that the alignment solution transferred onto the substrate is increased, and the film thickness of the alignment film is further increased. Therefore, a uniformity of the film thickness of the alignment film is increased, and an occurrence of poor display with pit-like defects can be avoided during light checking.

In addition, it can control the film thickness of the alignment film by adjusting the proportion of the auxiliary protrusions and the height difference between the main protrusions and the auxiliary protrusions. Since the thickness of the alignment film is increased, the film thickness uniformity of the alignment film can be improved. Thus, the occurrence of poor display with pit-like defects can be avoided during lighting check. For example, under the situation of the number of the protrusions is kept constant, increasing the proportion of the auxiliary protrusion can increase the storage amount of the alignment solution, whereby the film thickness of the alignment film can be increased. For another example, an accommodation space is enlarged by increasing the height of the main protrusions, thereby the storage amount of the alignment solution is increased. Alternatively, the accommodation space is enlarged by lowering the height of the auxiliary protrusions, whereby the storage amount of the alignment solution is increased.

Figure 2:
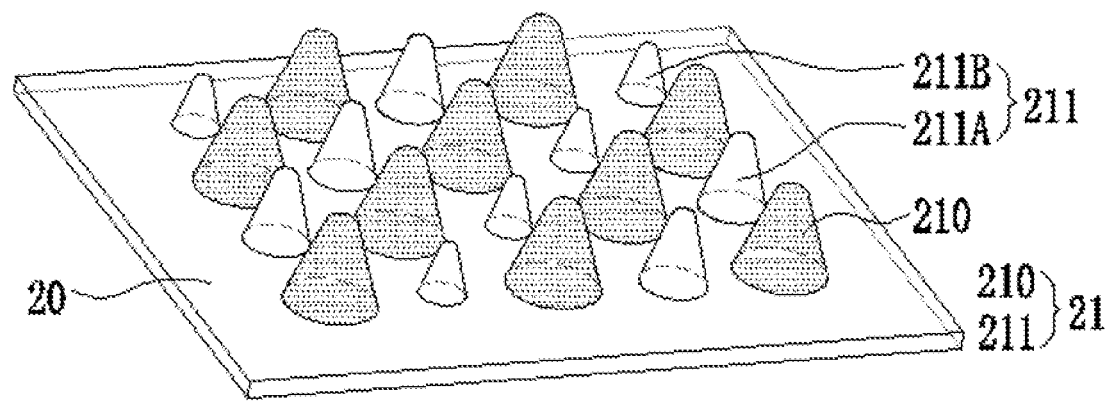
FIG. 2 is a schematic view of a printing plate according to another embodiment of the present invention.

Referring to FIG. 2, it is a schematic view of a printing plate according to another embodiment of the present invention. The printing plate includes a substrate 20 and a plurality of protrusions 21. The plurality of protrusions 21 are distributed at intervals on the substrate 20. The distinguishing features between the printing plate as shown in FIG. 2 and the printing plate as shown in FIG. 1 are that the protrusions 21 include main protrusions 210 and auxiliary protrusions 211, and the auxiliary protrusions 211 further include a first auxiliary protrusion 211A and a second auxiliary protrusion 211B. A height of the first auxiliary protrusion 211A is greater than a height of the second auxiliary protrusion 211B. Both of the heights of the first auxiliary protrusion 211A and the second auxiliary protrusion 211B are less than a height of the main protrusion 210.

Although the heights or the plurality of the auxiliary protrusions 211 are not uniform, the first auxiliary protrusions 211A and the second auxiliary protrusions 211B are distributed at intervals with the heights thereof in a regular variation as shown in the drawing. Alternatively, the auxiliary protrusions 211 have a variation of heights and are distributed from high to low in a regular variation. Of course, the auxiliary protrusions 211 having a plurality of different heights can be distributed in an irregular variation.

By designing the printing plate having matched protrusions with different heights, on the basis of the number of the protrusions being kept constant, a volume of each of the auxiliary protrusions can be further reduced in order to increase the storage amount of the alignment solution held by the printing plate. Thus, a thickness of the alignment film can be increased by the increased storage amount of the alignment solution held by the printing plate. A uniformity of the film thickness of the alignment film is increased. Accordingly, an occurrence of poor display with pit-like detects can be avoided during lighting check.

Figure 3:
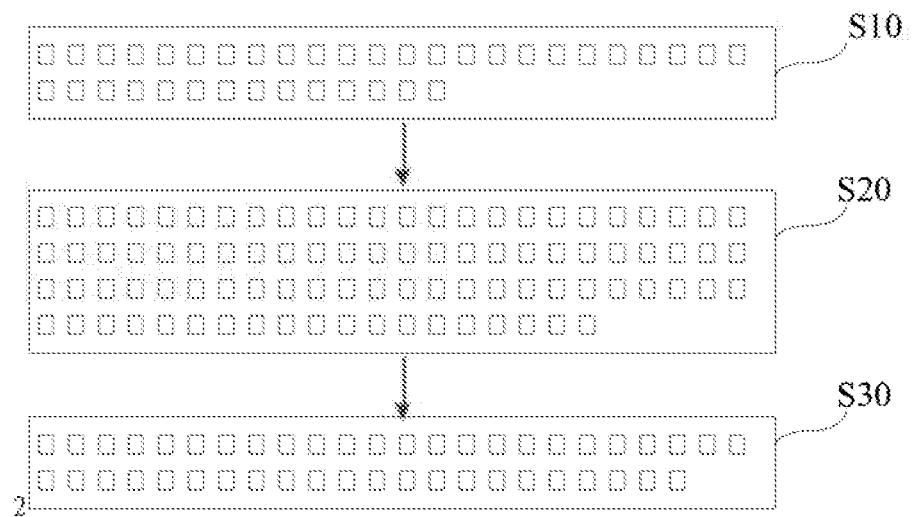
FIG. 3 is a flow chart of a method of manufacturing an alignment film by using a printing plate according to one embodiment of the present application.

Referring to FIG. 3, it is a flow chart of a method of manufacturing an alignment film by using a printing plate according to one embodiment of the present application. Also, in combination with FIG. 4A to FIG. 4B, they are schematic views illustrating different steps of manufacturing an alignment film by using a printing plate according to one embodiment of the present application. The method includes steps as follows.

Step S10, providing an array substrate for preparing the alignment film, and grooves are disposed at intervals in a surface of the array substrate for accommodating a signal circuit.

Figure 4A:
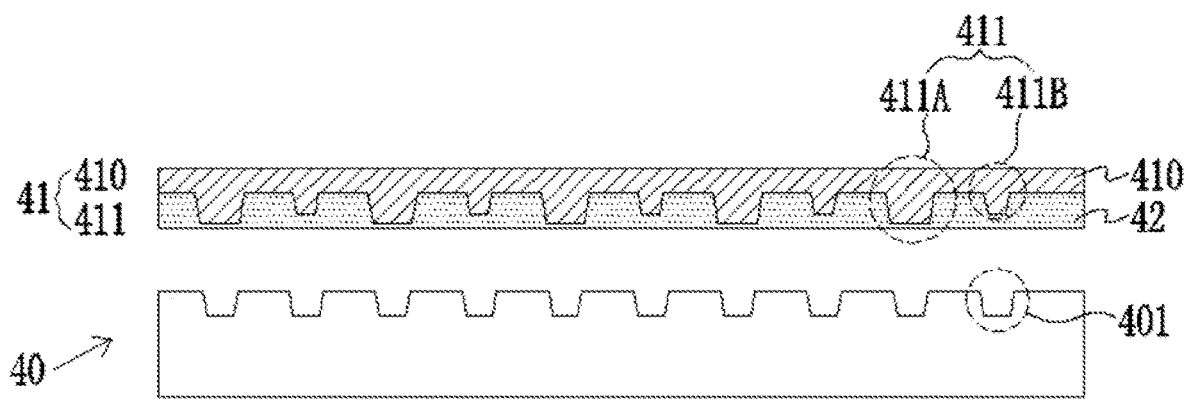
FIG. 4A to FIG. 4B are schematic views illustrating different steps for manufacturing an alignment film by using a printing plate according to one embodiment of the present application.

Specifically, as shown in FIG. 4A, a thin film transistor device (not shown in the FIG. 4A) and a signal circuit (not shown in the FIG. 4A) are formed on the array substrate 40. Grooves 401 are defined at intervals in a surface of the array substrate 40 in which an alignment film is to be prepared. The grooves 401 is used for laying a signal circuit.

Step S20, pressing one side of the printing plate which is stored with the alignment solution onto the array substrate. A diameter of at least a part of one of the protrusions of the printing plate is greater or less than a width of each of the grooves, and the alignment solution stored in an entire surface of the printing plate flows into a surface of the array substrate.

Specifically, an alignment solution 42 is stored in the printing plate 41. The printing plate 41 includes a substrate 410 and a plurality of protrusions 411 distributed at intervals. Each of the protrusions 411 includes a main protrusion 411A and an auxiliary protrusion 411B. The specific structure of the printing plate 41 is described in the above embodiment according to the present invention, and details are not described herein again. Pressing one side of the printing plate which is stored with the alignment solution onto the array substrate, and then the alignment solution stored in an entire surface of the printing plate flows into a surface of the array substrate.

Since a height of each of the main protrusions 411A is greater than a height of each of auxiliary protrusions 411B, only a portion of the main protrusions 411A can cover the grooves 401. Therefore, the possibility of that protrusions 411 covering the grooves is reduced. The non-adherence of the alignment solution 42 in the grooves 401 which results in poor display with pit-like defects can be greatly improved. Also, the film thickness of the alignment film can be increased by using the printing plate 41, and the poor display caused by uneven film thickness of the alignment film can be improved.

Furthermore, the coverage proportion of the protrusion 411 to the groove 401 is controlled by adjusting the proportion of the auxiliary protrusions 411B and the height difference between the main protrusions 411A and the auxiliary protrusions 411B. For example, on the basis of the number of the protrusions 411 being constant, increasing the proportion of the auxiliary protrusions 411B can further reduce the coverage of the protrusions 411 to the grooves 401, so that a uniformity of the alignment film is increased.

A diameter of each of the auxiliary protrusions 411B is less than a width of each of the grooves 401. Since a height of each of the main protrusions 411A is greater than a height of each of the auxiliary protrusions 411B, a gap is existed between each of the auxiliary protrusions 411B and each of the grooves 401. Therefore, the alignment solution 42 flow along the gaps to fill in in the grooves 401 along the gaps, and the uniformity of the alignment film is increased.

A diameter of each of the main protrusions 411A is greater than a width of each of the grooves 401. Since the main protrusions 411 cannot insert into the grooves 401 during a pressing process, the non-adherence of alignment solution 42 in the grooves can be improved, so that the uniformity of the alignment film is increased.

Step S30, after heat curing, the alignment film is formed in each of the grooves in the surface of the array substrate and a corresponding portion between two adjacent grooves.

Figure 4B:
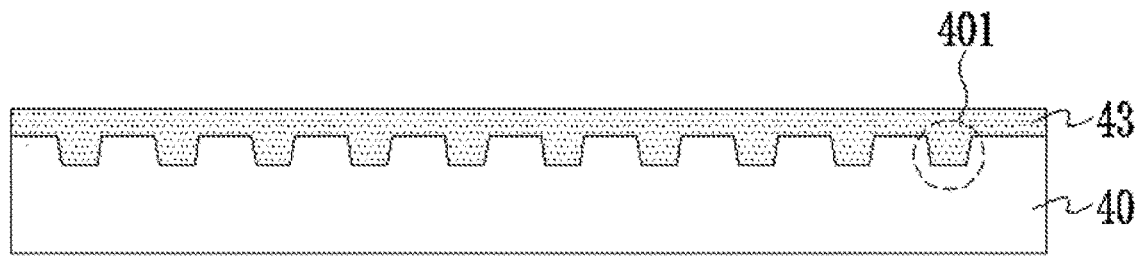

Referring to FIG. 4B, the alignment solution is filled in the grooves 401. An alignment film 43 is formed in each of the grooves 401 of the surface of the array substrate 40 and a corresponding portion between two adjacent grooves 401 after heat curing, so that the thickness of the alignment film 43 has good uniformity.

Figure 5:
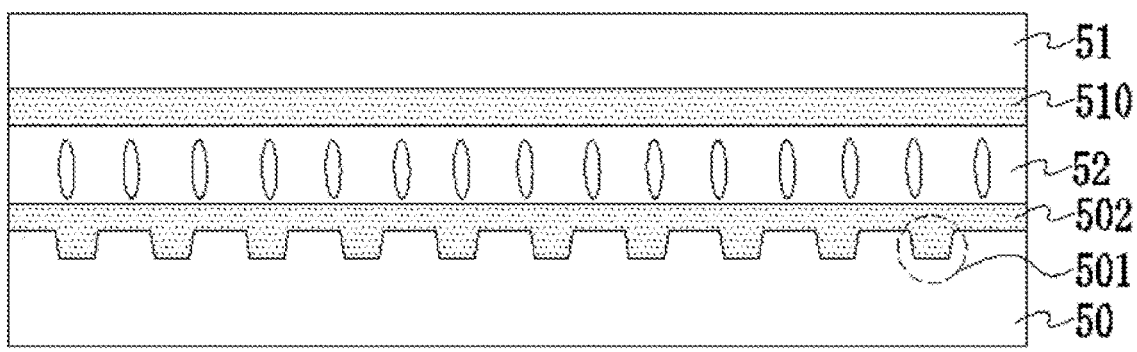
FIG. 5 is a schematic view of a liquid crystal display panel manufactured by the method according to one embodiment of the present invention.

Referring to FIG. 5, a liquid crystal display panel manufactured by the method according to one embodiment of the present invention is shown. The liquid crystal display panel includes an array substrate 50 disposed opposite to a color film substrate 51, and grooves 501 formed in a surface of the array substrate 50 for laying a circuit. The surface of the array substrate 50 is prepared with a first alignment film 502. A second alignment film 510 is prepared on a side of the color film substrate 51 facing the first alignment film. A liquid crystal layer 52 is sandwiched in between the first alignment film 502 and the second alignment film 510. The first alignment film 502 is formed in each of the grooves 501 of the surface of the array substrate 50 and a corresponding portion between two adjacent grooves 501.

Furthermore, the second alignment film 510 may also be manufactured by the printing plate according to the embodiment of the present invention.

The present application provides a method of manufacturing the alignment film, the liquid crystal display panel and the printing plate to form an alignment film by using the printing plate with different heights of protrusions matching with each other and coating the substrate with an alignment solution. Due to the design of the protrusions on the printing plate, the possibility of the protrusions covering the grooves in the surface of the substrate can be greatly decreased. On the other hand, the thickness of the alignment film can be increased, so that poor display with pit-like defects resulting from the alignment film being not adhered locally can be improved. Accordingly, an uneven thickness of the alignment film which results in a poor display can be also improved due to live increase of the thickness of the alignment film.

In the above, the present application has been described in the above preferred embodiments, but the preferred embodiments are not intended to limit the scope of the invention, and a person skilled in the art may make various modifications without departing from the spirit and scope of the application. The scope of the present application is determined by claims.

What is claimed is:

1. A printing plate for coating an array substrate with an alignment solution comprising:
   a substrate; and
   protrusions, wherein the protrusions are distributed at intervals on the substrate, a first gap is formed between two adjacent protrusions, and the first gap is used for storing the alignment solution;
   the protrusions comprising:
      a plurality of main protrusions presented as an array distribution; and
      a plurality of auxiliary protrusions distributed in the array of the main protrusions;
      wherein a height of each of the main protrusions is greater than a height of each of the auxiliary protrusions,
   wherein the array substrate comprises a thin film transistor and a signal circuit, grooves are disposed at intervals in a surface of the array substrate for laying the signal circuit, and a second gap is exists between at least a portion of each of the protrusions and at least a portion of each of the grooves when the printing plate is pressed fit with the array substrate.

2. The printing plate of claim 1, wherein the auxiliary protrusions are equally distributed between two adjacent main protrusions, and at least one of the auxiliary protrusions is disposed between the two adjacent main protrusions.

3. The printing plate of claim 1, wherein the auxiliary protrusions in the same row/column are disposed staggered with the main protrusions adjacent to the row/column.

4. The printing plate of claim 1, wherein a volume of each of the auxiliary protrusions is less than a volume of each of the main protrusions.

5. The printing plate of claim 1, wherein heights of the auxiliary protrusions are not uniform, and the auxiliary protrusions are distributed with the heights thereof in a regular variation or an irregular variation.

6. The printing plate of claim 1, wherein the protrusions each have a shape of a truncated cone, a cone, a frustum or a pyramid.

7. The printing plate of claim 1, wherein a diameter of each of the auxiliary protrusions of the printing plate is less than a width of each of the grooves.

8. The printing plate of claim 1, wherein a diameter of each of the main protrusions of the printing plate is greater than a width of each of the grooves.

9. A method of forming an alignment film by the printing plate of claim 1, comprising:
   step S10, providing the array substrate for preparing the alignment film;
   step S20, pressing one side of the printing plate which is stored with the alignment solution fit with the array substrate, wherein a diameter of at least a part of the protrusions of the printing plate is greater or less than a width of each of the grooves, and the alignment solution stored in an entire surface of the printing plate flows into a surface of the array substrate; and
   step S30, after heat curing, the alignment films are formed on the each of grooves of the surface of the array substrate and a corresponding portion between two adjacent grooves.

10. A method of claim 9, wherein a diameter of each of the main protrusions of the printing plate is greater than a width of each of the grooves, and the alignment solution is filled in the grooves.

11. A method of claim 9, wherein the second gap is exists between each of the auxiliary protrusions of the printing plate and each of the grooves, thereby the alignment solution is filled in the grooves.

12. A liquid crystal display panel manufactured by the method of claim 9, comprising:
   the array substrate and a color film substrate disposed opposite to the array substrate;
   grooves formed in a surface of the array substrate for laying a circuit, wherein the surface of the array substrate is prepared with a first alignment film;
   a second alignment film prepared on a side of the color film substrate facing the first alignment film; and
   a liquid crystal layer sandwiched in between the first alignment film and the second alignment film;
   wherein the first alignment film is formed in each of the grooves of the surface of the array substrate and a corresponding portion between two adjacent grooves.

* * * * *